June 4, 1968   S. T. CARTER   3,386,565
HOLD-DOWN BELT FOR LABELING MACHINES
Filed Oct. 20, 1965   7 Sheets-Sheet 1

Inventor
Sidney T. Carter

June 4, 1968  S. T. CARTER  3,386,565
HOLD-DOWN BELT FOR LABELING MACHINES
Filed Oct. 20, 1965  7 Sheets-Sheet 2

June 4, 1968  S. T. CARTER  3,386,565
HOLD-DOWN BELT FOR LABELING MACHINES
Filed Oct. 20, 1965  7 Sheets-Sheet 4

June 4, 1968  S. T. CARTER  3,386,565
HOLD-DOWN BELT FOR LABELING MACHINES
Filed Oct. 20, 1965  7 Sheets-Sheet United States Patent Office 3,386,565
Patented June 4, 1968

3,386,565
HOLD-DOWN BELT FOR LABELING MACHINES
Sidney T. Carter, Shrewsbury, Mass., assignor to Geo. J. Meyer Manufacturing Co., Cudahy, Wis., a corporation of Wisconsin
Filed Oct. 20, 1965, Ser. No. 498,538
4 Claims. (Cl. 198—162)

ABSTRACT OF THE DISCLOSURE

A hold-down belt as a constituent element of a labeling machine wherein a bottle, standing upright, is advanced by a conveyor toward and through a labeling zone while the hold-down belt applies downward pressure to the top of the bottle to prevent the latter from tipping, and wherein that surface of the hold-down belt which contacts the top of the bottle is flat and horizontal, and of a hard material of so low a coefficient of friction that the bottle may be oriented about its vertical axis without relieving the downward pressure applied by the belt.

---

This invention pertains to labeling machines of the so-called "straight-away" type wherein bottles, which are to be labeled, stand erect while being moved along a rectilinear path by a conveyor means, while labels, received from a magazine located at one side of said path, are taken from the magazine and after receiving a coating of gum are pressed against the side of the moving bottle, and wherein, to prevent tipping of the bottle in response to the force applied in affixing the label, a headgrip or hold-down device applies downward clamping pressure to the top of the bottle while the latter passes through the field of action of the label-applying means, the present invention concerning, in particular, an improved hold-down device.

In machines of the general type above referred to, it has been customary to employ a hold-down device in the form of an endless belt so arranged that the lower run of the belt is substantially horizontal and parallel to the conveyor path, and so located and arranged that the lower run of the belt contacts and applies downward pressure to the tops of the moving bottles so as to prevent them from tipping. Such a hold-down device is described, by way of example, in the patent to Sidney T. Carter, No. 2,940,630, dated June 14, 1960, wherein the hold-down device is disclosed as an endless belt provided at its inner side with teeth for engagement with driving and guide sprockets and provided at its outer side with a thick layer of resiliently yieldable material, with means for guiding the belt to form a run parallel to the path along which the articles move and wherein the layer of yieldable material presents a substantially continuous surface for contact with the article tops. In a later patent, No. 3,142,374, dated July 28, 1964, the same Sidney T. Carter discloses novel means whereby the lower run of the endless hold-down belt is brought down into contact with the tops of the bottles in such a way substantially to avoid the application of a horizontal component of force to the bottles at the point of contact.

As just stated, the endless belt, as disclosed in each of said patents, has a bottle-contacting surface of resilient material, for example rubber, which is forced down onto the top of the bottle with substantial pressure so that the resilient material is somewhat indented and obtains a firm frictional grip on the bottle.

However, it is often required that the labeling machine apply the label to a particular area of the peripheral surface of the bottle and thus it may become necessary to turn or orient the bottle, just before the label is affixed thereto, to bring the designated area of the bottle into accurate registry with the label as the latter is presented to the bottel. If a hold-down belt, such as above described, be pressed firmly down against the top of the bottle, it is difficult, if not impossible, to turn or orient the bottle after the belt has once engaged it, and thus, when orientation is required it has sometimes been necessary to dispense with the hold-down belt, and thus to forfeit its desired function.

The present invention concerns such an improvement in a hold-down belt of this general type that while it is capable of exerting all of the downward force requisite to clamp the bottle down against the coveyor and so to prevent the bottles from tipping, at the same time its bottle-engaging face is such that, while the belt is still exerting such downward pressure, it is possible to turn or orient the bottle. Briefly, in the attainment of this result the endless belt of the present invention comprises a series of rigid, bottle-contacting elements so connected that the belt is capable of passing around drive and guide pulleys or sprockets, but wherein the bottle-contacting surfaces, at least, of said elements are of a smooth, hard material having a low coefficient of friction. For simplicity, these bottle-contacting, pressure-applying elements may consist wholly of nylon. However, since such bottle-contacting elements are not resilient, it is requisite, in using such a belt, to support and guide it in a fashion such that it will resiliently yield, as a whole, to accommodate itself to bottles of slightly different heights and will apply the requisite downward force. It is also necessary so to guide it, as it approaches the point of contact with the bottle top, as to avoid or minimize any substantial lateral component of force which might tend to tip the bottle as the belt comes in contact with the bottle.

These pressure-applying elements as herein disclosed are so shaped as collectively to provide a channel for the reception of a sprocket chain by means of which said elements are connected, and two lateral channels for the reception of fixed guide members. For lack of an available descriptive term, these elements are here referred to as "shoes," each comprising a rigid plate-like bottle-contacting member which, when in operative position, is substantially horizontal; two horizontally spaced parallel web members perpendicular to the plate member and which form the side walls of the channel which receives the sprocket chain; and two oppositely directed horizontal lips extending outwardly from the upper edges of the web members and which constitute the upper walls of the lateral channels and by contact with the guide members limit downward movement of the horizontal run of the chain.

In the accompanying drawings the novel hold-down device of the present invention is illustrated as embodied in a labeling machine of the general type above referred to, FIG. 1 being a front elevation, with intermediate portions broken away, showing the belt and belt-supporting means but omitting other elements of the labeling machine.

Figure 8:
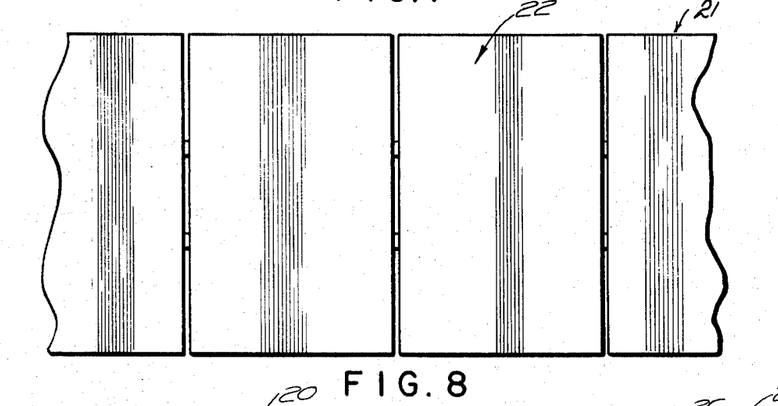
FIG. 8 is a fragmentary view showing the bottom surface of the belt illustrated in FIG. 7, that is to say, the surface which contacts the tops of the bottles.
Figure 9:
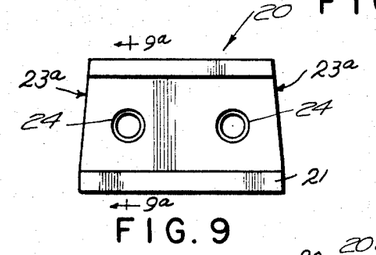
FIG. 9 is a side elevation showing a single one of the bottle-contacting shoes comprised in the hold-down belt.
Figure 9A:
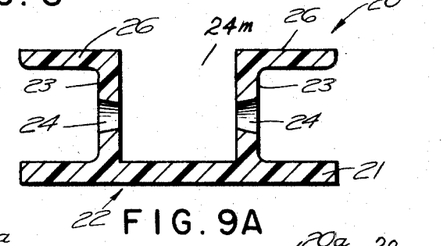
FIG. 9a is a section on the line 9a—9a of FIG. 9.

Referring to the drawings, the novel hold-down belt of the present invention (FIGS. 1, 2, 6 and 7) is shown as comprising a series of flexibly connected bottle-contacting elements 20, hereinafter for convenience in description being referred to as "shoes," each as shown in FIGS. 9 and 9a comprising a plate-like member 21 having a smooth, flat bottle-contacting face 22 (FIG. 8), this plate-like member 21, as here shown, being substantially rectangular. Merely by way of example, this plate 21 may be approximately one inch in width transversely of the belt; 1½ inches in length longitudinally of the belt; and ⅛ inch thick. The shoes 20 are substantially rigid and the surface 22, at least, of each plate 21 is desirably of a material having a low coefficient of friction, for example nylon, and is smooth and flat. Since nylon has other characteristics desirable in the bottle-engaging shoes 20, it is convenient to make the entire shoe of nylon, as a unitary piece, although it may be made of other suitable material having a similar low coefficient of friction and as an assemblage of independently formed parts.

Figure 7:
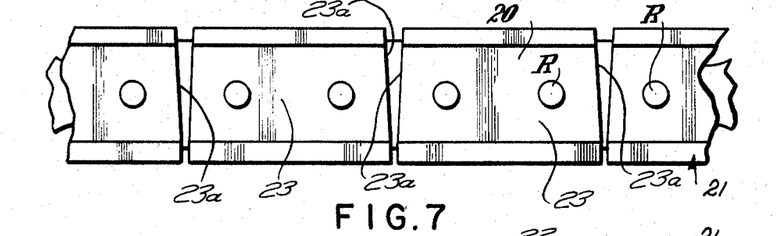
FIG. 7 is a fragmentary front elevation, to larger scale, showing a portion of the lower run of the belt.
Figure 10:
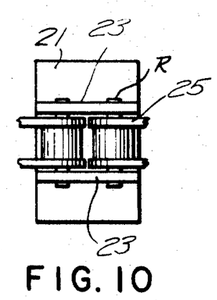
FIG. 10 is a plan view of one of the bottle-contacting shoes of FIG. 7, showing a portion of the sprocket chain which connects the series of shoes.
Figure 13:
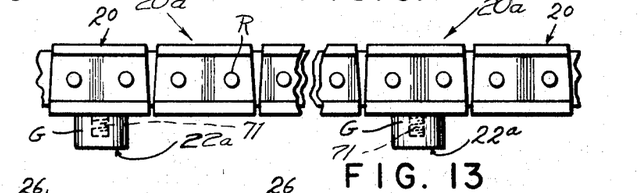
FIG. 13 is a view similar to FIG. 7, but showing a belt of slightly modified type.

As illustrated in FIGS. 9 and 9a, each of the shoes 20 comprises spaced parallel webs or walls 23 extending upwardly from the plate 21, as shown in FIG. 9a, and defining between them a channel 24 (FIG. 9a) for the reception of a flexible connecting device, for example a conventional sprocket chain 25 (FIG. 10) comprising, as is usual, parallel series of outer links and a second series of inner links, the outer and inner links being connected, with intervening spacers, by means of studs or rivets R (FIGS. 7, 10 and 13). As shown in FIG. 9, each of the webs or walls 23 is provided with two holes 24 (preferably tapered) which receive the outer ends of the studs or rivets R which connect the chain links, the end portions of the studs being upset in the holes 24 or otherwise secured. The channel 24 which receives the chain is open at its top, as viewed in FIG. 9a, so that the chain 25 is exposed (FIG. 10) for engagement with driving and guiding sprockets. As illustrated in FIG. 9, the right and left edges 23a of the webs 23 converge upwardly, so that, in passing about a sprocket, these edges 23a of adjacent shoes 21 are free to close toward each other to permit the belt to follow an arcuate path in passing about the sprocket. As shown in FIG. 9a, each of the webs or walls 23 is provided at its upper edge with an outwardly directed, integral, horizontal lip 26 for engagement with suitable guides as hereinafter described.

Figure 15:
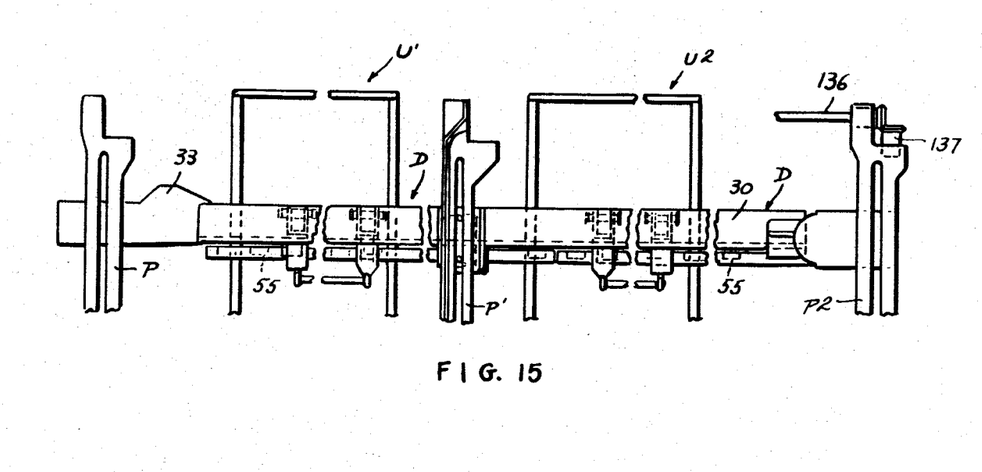
FIG. 15 is a fragmentary diagrammatic small-scale rear elevation showing a belt like that of FIG. 13 as installed in a labeling machine wherein the bottles to be labeled pass successively through two label-applying units so arranged that certain recurrent bottles are labeled in passing through one unit and the intervening bottles are labeled while passing through the second unit.
Figure 15A:
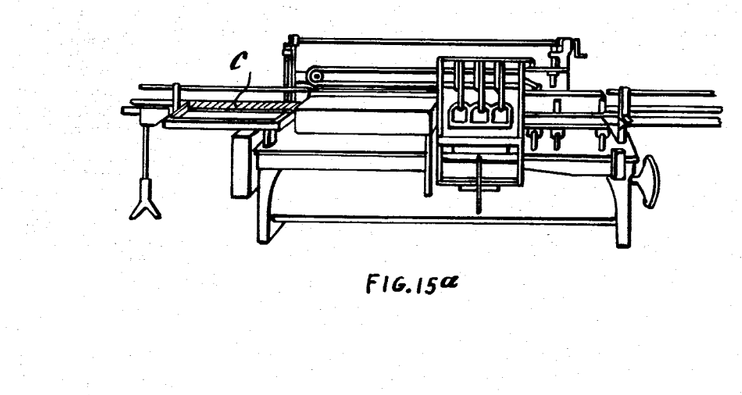
FIG. 15a is a diagrammatic rear elevation showing a conventional labeling machine of the type in which the present invention may be employed.

The hold-down belt of the present invention is supported by an elongate, vertically adjustable rigid frame D (FIG. 2) as is customary in machines of this general type. As illustrated in FIG. 15, the machine is of the kind wherein two labeling units $U_1$ and $U_2$ are served by the same conveyor and hold-down belt, the latter being carried by an elongate frame D which is shown as mounted on vertically slotted posts P, $P^1$ and $P^2$ with suitable provision, for example, as suggested at 136, 137 (FIG. 15) and as more fully illustrated in the patent to Carter, 2,940,630, dated June 14, 1960, for adjusting the frame vertically to accommodate bottles of different heights and for locking it in adjusted position. Since the parts for adjusting the frame D are not a novel feature of the present invention, they are not herein further shown nor described. In this machine each labeling unit is operative to apply labels simultaneously to a plurality of bottles, one unit applying labels to recurrent bottles, only, and the second unit applying labels to those bottles which were not labeled by the preceding unit.

Figure 2:
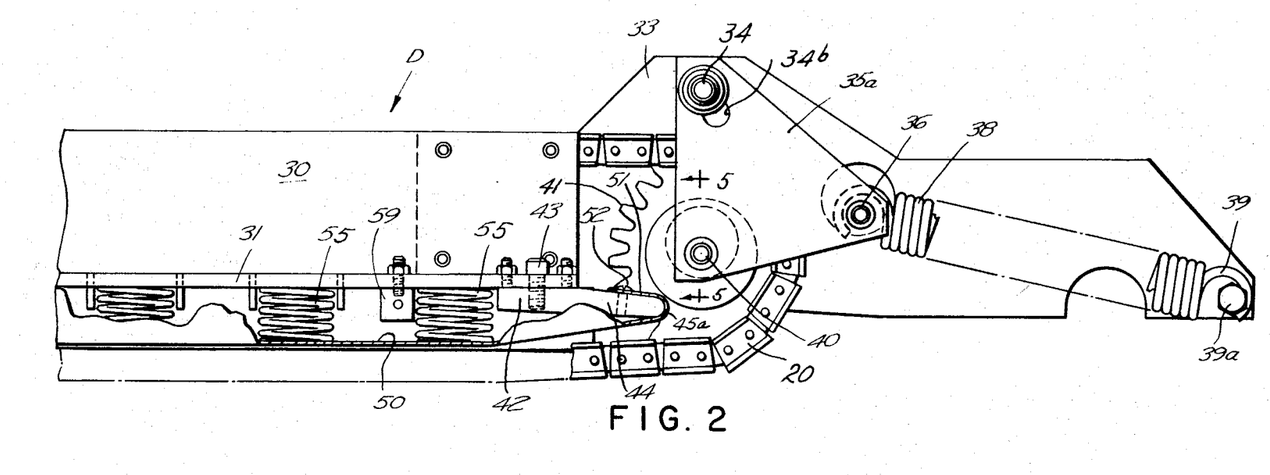
FIG. 2 is a larger scale, fragmentary elevation showing the infeed end of the hold-down belt and the supporting parts.
Figure 3:
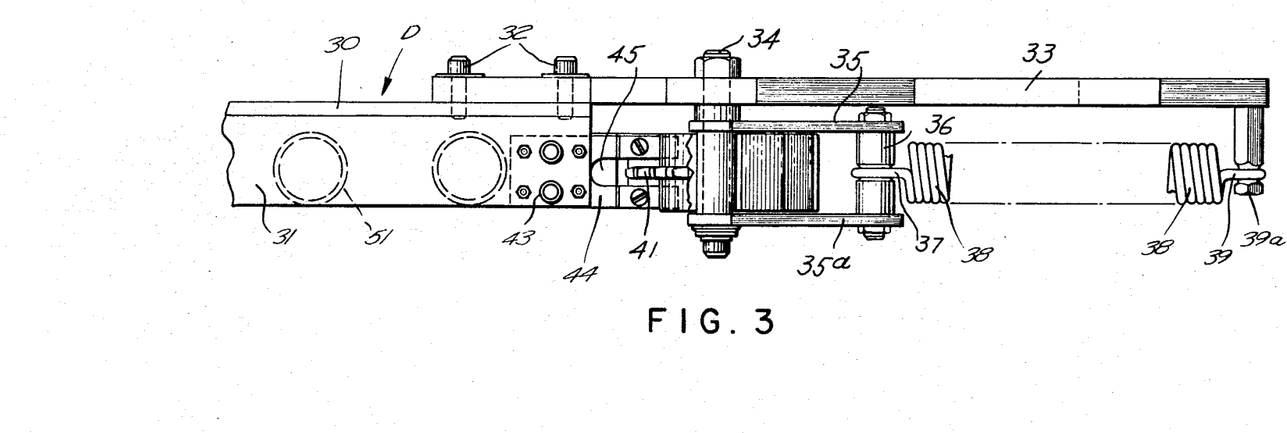
FIG. 3 is a plan view of the parts shown in FIG. 2.
Figure 4:
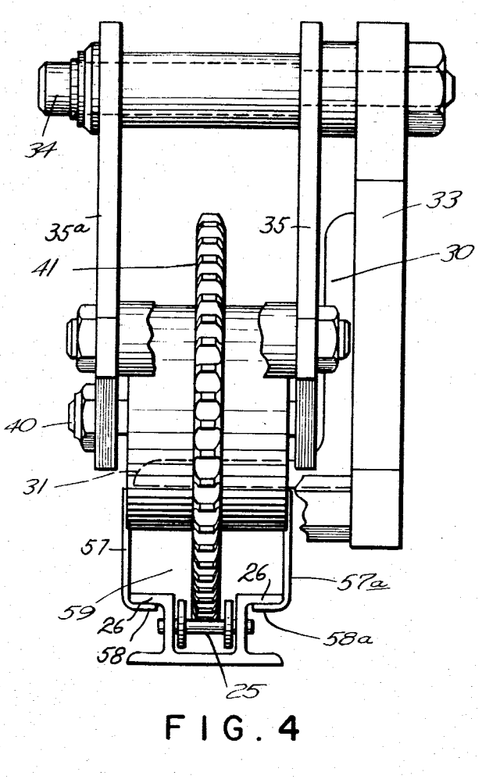
FIG. 4 is an end elevation, to larger scale, of the parts shown in FIG. 3.
Figures 5, 16, 17, 18:
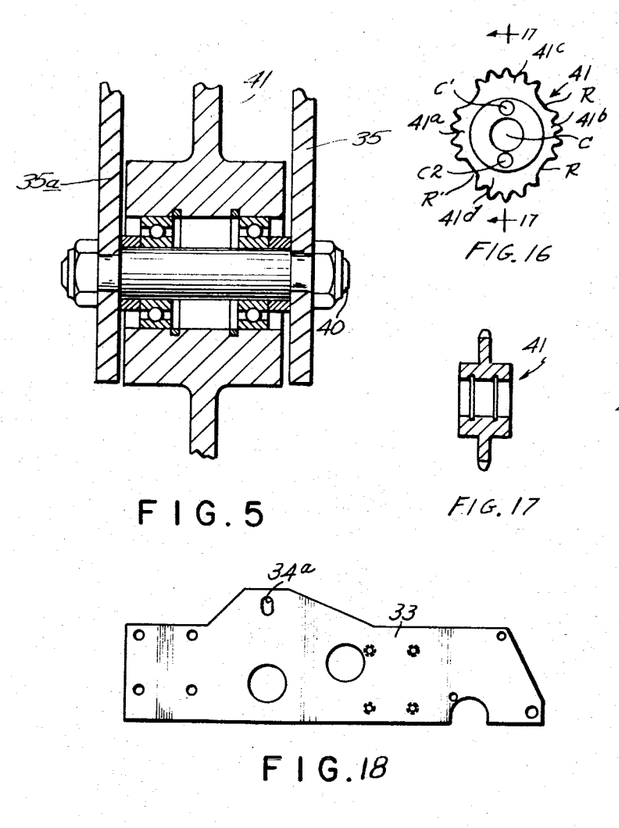
FIG. 5 is a section on the line 5—5 of FIG. 2.
FIG. 16 is a front elevation showing a desirable guide sprocket for the hold-down belt.
FIG. 17 is a section on line 17—17 of FIG. 16.
FIG. 18 is a side elevation showing a plate constituting an element of the frame.
Figure 6:
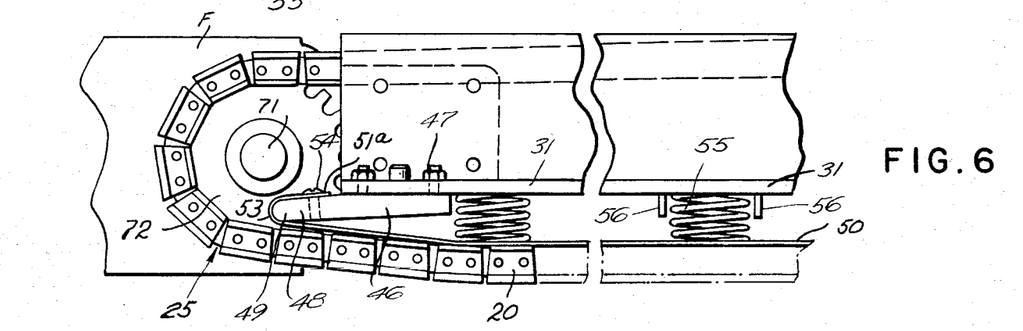
FIG. 6 is a view similar to FIG. 2, but showing a slight modification.

In accordance with the present invention, the frame D comprises a long L-beam 30 (FIGS. 1, 2, 3, 4, 6, 14 and 15) having the horizontal flange 31 (FIGS. 1, 2, 3 and 6) and a vertical web to which a vertical plate 33 (FIGS. 1, 2, 3, 4 and 18) is connected, at the feed end of the machine, by means of bolts 32 (FIG. 3). A stud 34 (FIGS. 3 and 4) is adjustably fixed at its rear end in a vertically elongate slot 34a (FIG. 18) in the plate 33 and provides pivotal support for a frame in which the idler or guide sprocket 41 for the chain is mounted. This frame comprises two parallel, spaced plates 35 and 35a (FIGS. 2, 3, 4 and 5). These plates 35 and 35a are of generally triangular shape having diagonal slots 34b (FIG. 2) at their upper corners for the reception of the supporting stud 34, and each having an opening near its right-hand apex for the reception of a spacer 36 (FIGS. 2 and 3) having a centrally located groove which receives one end 37 (FIG. 3) of a coiled tension spring 38 whose opposite end 39 is secured to a fixed stud 39a projecting forwardly from the plate 33. The spring 38 keeps the hold-down belt under tension, the line of action of the spring being downward (FIG. 2). Near their upper left-hand corners (FIG. 2) the plates 35 and 35a have elongate openings or slots 34b for the reception of the stud 34. At their lower left-hand corners the plates 35 and 35a have circular holes for the reception of a non-rotatable shaft 40 on which the idler or guide sprocket 41 (FIGS. 2, 3, 4 and 16), for the feed end of the belt, is mounted to rotate. The sprocket 41 (FIGS. 16 and 17) is of the general type of that more fully described and illustrated in the above United States patent to Carter, 3,142,374. The vertically elongate slot 34a in the fixed plate 33 (FIG. 18) is necessary to provide for the aucurate positioning of the axis of a non-circular guide sprocket 41 (FIGS. 1, 2, 3, 4 and 16). Sometimes the L-beam 30 may not be perfectly straight and necessitates some adjustment up or down. Such adjustment of the beam may require that the stud 34 be adjusted up or down to compensate for the adjustment of the beam. Having once adjusted it, it is then fixed in position.

The inclined slots 34b in the plates 35 and 35a permit the supporting frame for the eccentric pulley to move up slightly at an angle which is approximately 30° to the vertical. If the support for the hold-down belt be set too low or if an abnormally high bottle enters between the conveyor and the hold-down belt, the spring 38, which pulls in opposition to the direction of motion of the belt, stretches and allows the infeed end of the belt to rise sufficiently to avoid a jam.

A rigid support 42 (FIG. 2) is secured by means of bolts 43 to the underside of the horizontal flange 31 of the frame D, at a point just to the left of the guide sprocket 41, this support having a downwardly inclined right-hand end portion 44 provided with a slot 45 (FIG. 3) to provide clearance for the sprocket wheel 41. The right-hand free edge of the support 42 is smoothly rounded as shown at 45a (FIG. 2).

At the opposite end of the frame D, that is to say, at the discharge end of the machine, a similar rigid support 46 (FIG. 6) is secured by bolts 47 to the underside of the horizontal flange 31 of the frame and this support has a downwardly and outwardly inclined portion 48 having a smoothly rounded lower edge 49.

A thin ribbon or wear strip 50 (FIGS. 1, 2, 11 and 12) of resilient steel is secured at one end 51 (FIG. 2) to the sloping upper surface of the support 44 by means of screws 52 and extends down and around the rounded edge 45 of the support and then in a substantially horizontal run to the opposite end of the machine where its end portion 51a is drawn up over the smoothly rounded edge 49 of the support 46 and secured by screws 54 to the support.

Figure 1:
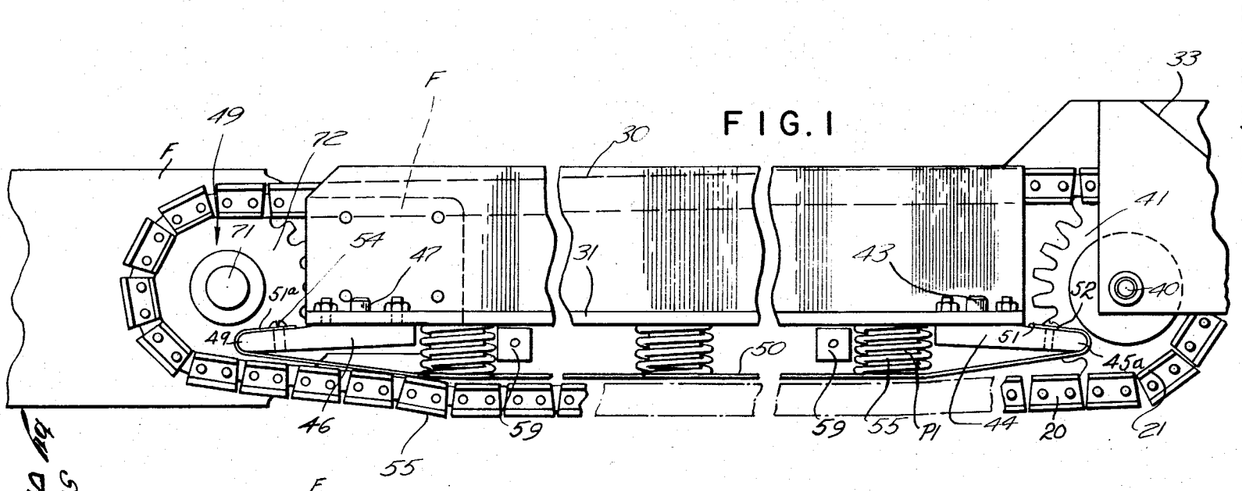

As illustrated in FIG. 1, a supporting frame F is bolted to the vertical flange of the L-shaped beam 30 at the delivery end of the machine and this frame F supports a driven shaft 71 on which there is mounted a conventional sprocket 72 which drives the hold-down belt, it being understood that, as is common in machines of this type, the shaft 71 will be driven (by means not here shown) in exact timed relation to the conveyor (not shown) on which the bottles are supported while being advanced through the labeling unit or units, all in accordance with customary practice.

At fixed intervals coiled compression springs 55 (spaced apart, according to the spacing of successive bottles) are arranged beneath the horizontal flange 31 of the L-beam 30 with their lower ends (FIG. 2) bearing against the upper surface of the resilient wear strip or ribbon 50. To hold these springs 55 properly positioned, their upper portions may embrace downwardly projecting centering posts P[1] (FIG. 1) or be confined within sets of rigid studs 56 (FIG. 6) extending downwardly from the flange 31.

Elongate rigid guide strips 57 and 57a (FIGS. 4, 11, 12 and 14) are attached to the front and rear vertical faces, respectively, of blocks 59 which are secured in spaced relation, by means of screws 60 (with provision for adjustment) to the underside of the flange 31 of the L-beam 30. These guide strips 57 and 57a have horizontal flanges 58 and 58a, respectively, which are in a plane below that of the undersurfaces of the spacer blocks 59. As shown, for example, in FIGS. 4 and 11, the wear strip or ribbon 50 underlies the spacer blocks 59 while the flanges 58 and 58a of the guide strips are located between the lips 26 of the shoe 20 and the plate 21 of the shoe. Since the space between the lip 26 of the shoe and the plate 21 of the shoe exceeds the thickness of the flange 58, the shoe is free to move up or down to a limited extent, but the flanges 58 and 58a of the guide strip limit downward motion of the hold-down belt, although the lower run of the belt is constantly urged downwardly by the springs 55.

Figures 11, 12:
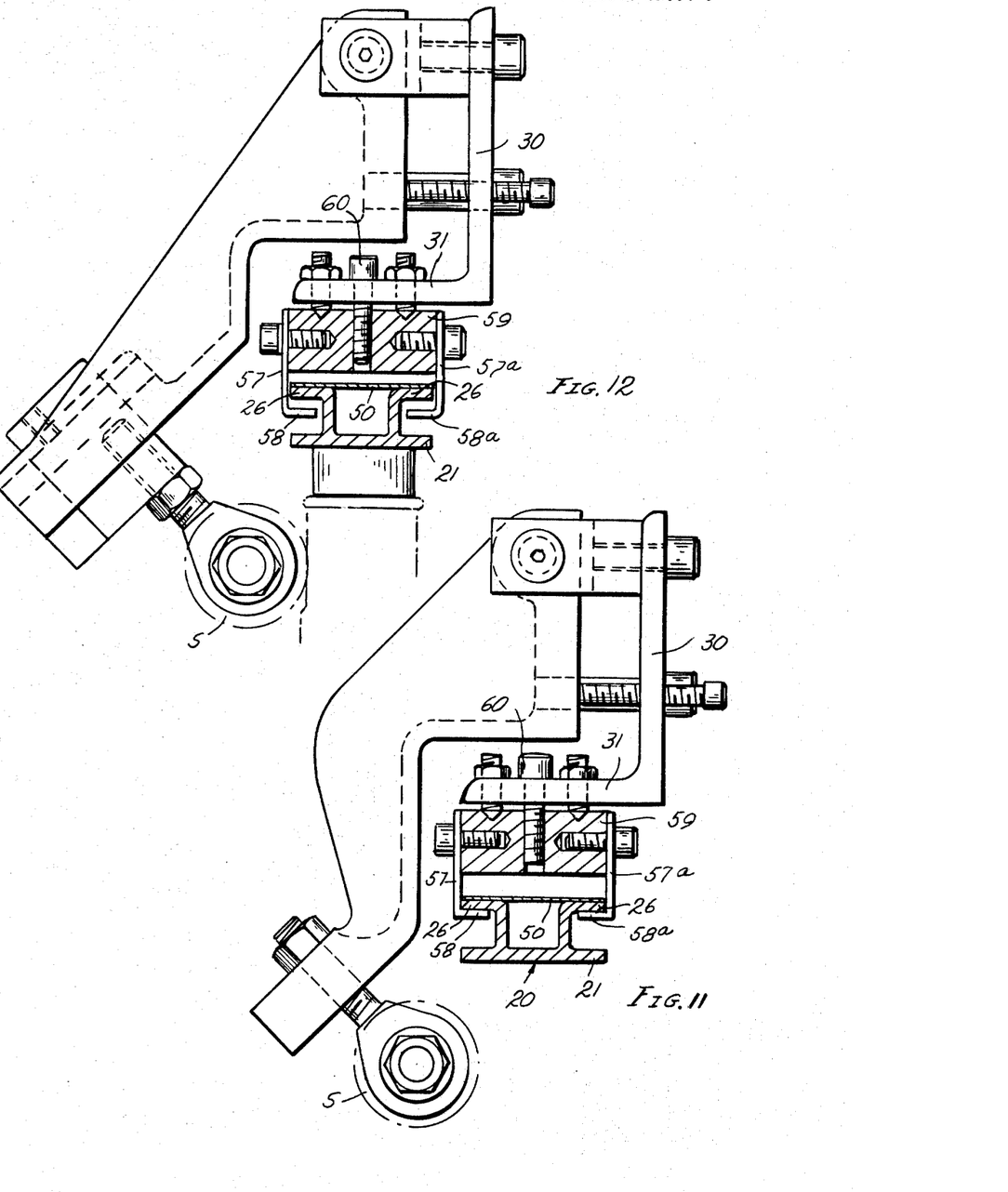
FIG. 11 is a fragmentary vertical section through the lower run of the hold-down belt, illustrating certain additional features not related to the present invention, but showing the hold-down belt as positioned when no bottle is in contact with it.
FIG. 12 is a view similar to FIG. 11, but illustrating the lower surface of the belt in functional contact with the top of a bottle.

Normally, each spring 55, by pressure against the flexible wear strip or ribbon 50, forces the latter down and thus applies downward pressure to the lower run of the belt, so as resiliently to urge the hold-down belt toward the position shown in FIG. 11, where the lips 26 of the shoes rest upon the flanges 58 and 58a. However, when a bottle is advanced by the conveyor beneath the lower run of the hold-down belt (where the latter is passing about the idler sprocket 41) and assuming that the frame D of the hold-down device has been properly adjusted with respect to bottles of the height which are being labeled, the bottles, in entering beneath the belt, will slightly elevate the lower run of the belt so that, as shown in FIG. 12, the lips 26 of the shoes will be spaced from the horizontal flanges 58 and 58a of the guide members 57 and 57a. Thus, although the hold-down belt itself is not resilient, it is urged downwardly, resiliently, by the action of the part 50 and the springs 55, so that downward clamping pressure is applied to the bottle top, holding the latter firmly against the conveyor. However, because the lower surface 22 of the hold-down shoe is smooth and rigid and of a material having a low coefficient of friction, it is readily possible to orient a bottle, standing upon a smooth conveyor and whose top is being pressed down by the hold-down belt, so as accurately to place the bottle in proper position to receive a label, although the bottle is adequately prevented by the pressure of a shoe 20 from tipping in response to label-applying pressure.

Moreover, it will be noted that by the use of bottle-contacting shoes such as disclosed, and by the use of the guide members 58 and 58a, with their horizontal flanges, the several shoes of the series are so controlled that the faces 21 of the series of shoes collectively form a substantially continuous and substantially horizontal surface.

In FIGS. 11, 12 and 13 there is illustrated a feature which is not necessarily associated with the particular hold-down belt here disclosed, that is to say, a helical feed screw S arranged to engage the neck portion of a bottle, this feed screw being driven (by means not here illustrated) at such a speed as to advance the neck portions of the bottles at the same rate that the conveyor advances the bottoms of the bottles; thus with reference to especially very tall bottles, to insure a smooth advance movement of the bottle and avoid any possible jamming of the bottle as it is advanced.

As herein illustrated (FIGS. 16 and 17) the sprocket 41 comprises four toothed segments 41a, 41b and 41c, 41d respectively, the diametrically opposed segments 41a and 41b having their teeth arranged in circular arcs coaxial with the center C of the sprocket, while the centers $C^1$ and $C^2$ of the toothed segments 41c and 41d are eccentric with respect to the center C of the sprocket. The mode of operation of this sprocket 41, in intermittently forcing a portion of the hold-down belt (which has just become a part of the horizontal run) vertically down for contact with a bottle top, is substantially the same as that of the sprocket specifically disclosed in the above United States Patent 3,142, 374, and need not be further described.

Figure 13A:
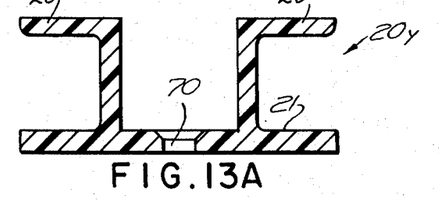
FIG. 13a is a transverse section to larger scale showing one of certain recurrent shoes employed in making the belt of FIG. 13.
Figure 14:
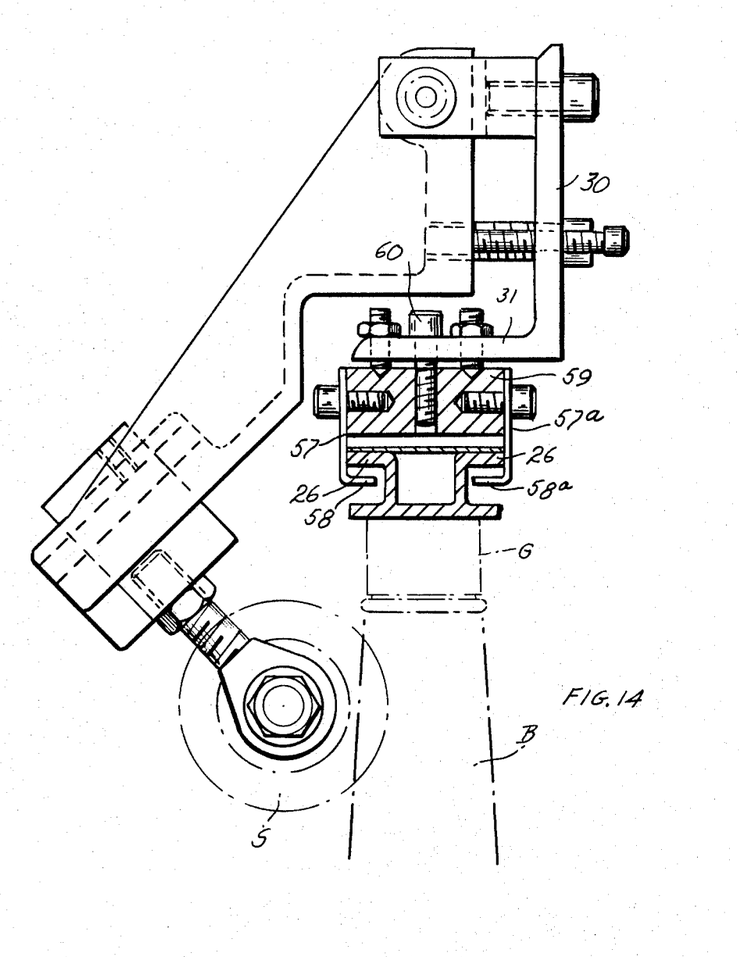
FIG. 14 is a view similar to FIG. 12, but showing a belt like that of FIG. 13, as operatively related to a bottle.

In the application of certain types of neck label in which the upper margin of the label may initially extend above the extreme upper edge of the bottle neck, a hold-down belt, such as that herein above described, and wherein the bottle-contacting elements are rigid, might cause difficulty by so engaging the upstanding portion of the label as to crush it down and spoil it. To avoid such a situation, the present invention contemplates the employment of a hold-down belt such as more particularly illustrated in FIGS. 13 and 13a, wherein the belt is in all other respects like that above described, but wherein, at regularly recurrent intervals, one of the constituent shoes of the hold-down belt, as shown at 20a (FIG. 13), has projecting downwardly from its lower face a plug G, usually circular in horizontal section and having a flat horizontal bottom surface 22a. With such an arrangement and assuming that these plugs G are accurately spaced apart on center, according to the spacing of the center lines of successive bottles, and assuming that the supporting frame for the belt is properly adjusted vertically, and a bottle is advanced beneath the receiving end of the belt, the extreme upper edge of the bottle neck will be contacted by the flat bottom surface 22a of one of the plugs and, assuming accuracy of timing of the conveyor and belt, and the proper dimensions for the plug, the bottom of the plug will come down concentrically into contact with the top edge of the neck of bottle B (FIG. 14), but will not extend outwardly beyond said edge, so that it will not crush or disturb the label, although said upper margin of the label may project slightly above the top edge of the bottle neck.

To facilitate the use of such plugs, shoes 20y (FIG. 13a) may be made exactly like the shoes 20 above described but each having a centrally located hole 70 in the plate 21 for the reception of a screw 71 (FIG. 13) having threaded engagement with a plug member G made independently of the shoe itself. However, it is contemplated that the plug and shoe proper may be molded as an integral mass of material if desired.

While one desirable embodiment of the invention has herein been disclosed by way of example, it is to be understood that the invention is broadly inclusive of any and all modifications falling within the scope of the appended claims.

I claim:

1. An endless hold-down belt comprising a series of rigid shoes, each including a member having a flat bottle-contacting face and each of said members having spaced parallel webs which define between them a channel for the reception of a sprocket chain by means of which said shoes are united, the webs having holes for the reception of the opposite ends, respectively, of pins whereby adjacent links of the sprocket chain are connected, and each web having a horizontal outwardly directed lip, spaced from and parallel to said bottle-contacting face, the lips extending in opposite directions and constituting means whereby a horizontal run of the belt may be supported.

2. The combination according to claim 1, further characterized in that from the flat plate-like member of each of regularly recurrent shoes of the series a rigid plug projects, said plug having a flat bottle-contacting end face of a diameter less than that of the top of the bottle to be labeled.

3. The combination according to claim 1, wherein to avoid interference with a label which projects above the upper extremity of the bottle neck, each of the regularly recurrent shoes of the series has a spacer element projecting from its plate-like member, said spacer element being of a diameter exceeding that of the bore of the bottle neck but less than that of the circle defined by the outer periphery of the top of the bottle neck, each spacer element having a flat end surface for contact with the top edge of the bottle neck.

4. In a labeling machine of the kind which includes a conveyor having an article-supporting surface of a character such that a bottle standing thereon may be oriented to present it in proper position to receive a label from a label-applying device, the conveyor being operative to move bottles, while standing erect, along a rectilinear path, in combination, a hold-down belt operative, by contact with the top of a bottle so moving, to prevent the bottle from tipping in response to lateral pressure while permitting it to be oriented, said hold-down means comprising an endless sprocket chain, means, including a driven sprocket, for driving the chain and to define a substantially horizontal run parallel to and above the conveyor, characterized in that the outer side of said belt is constituted by a series of rigid shoes, each of said shoes being so shaped and dimensioned and so attached to the endless sprocket chain as to permit said chain to be trained about spaced rotary sprockets turning about parallel axes, and means for applying resilient downward pressure to that portion of the chain which forms said horizontal run thereby to press the constituent shoes into contact with the tops of bottles moving along said path, further characterized in that each of said shoes has a recess in one face, the several recesses collectively forming a channel for the endless sprocket chain, each shoe comprising a plate-like portion having a smooth, hard surface for contact with the bottle top, and each shoe having guide lips spaced from and parallel to said plate-like portion, and elongate fixed guide elements for contact with said lips thereby to limit downward movement of said horizontal run of the belt in response to said downward pressure.

References Cited
UNITED STATES PATENTS

| | | | |
|---|---|---|---|
| 837,319 | 12/1906 | Meahl | 226—172 X |
| 1,904,885 | 4/1933 | Seeley | 226—172 |
| 2,236,751 | 4/1941 | Dine | 226—172 |
| 2,288,612 | 7/1942 | De Wyk | 198—208 |
| 2,479,822 | 8/1944 | Enkur | 198—165 |
| 2,736,425 | 2/1956 | Fisk | 226—172 |
| 2,754,956 | 7/1956 | Sommer | 198—162 |
| 2,792,930 | 5/1957 | Graham | 226—172 |
| 2,853,179 | 9/1958 | Norin | 198—208 X |
| 2,884,120 | 4/1959 | Bruestle | 226—172 |
| 2,915,171 | 12/1959 | Peck | 226—172 |
| 3,073,497 | 1/1963 | Castleton | 226—170 X |
| 3,142,374 | 7/1964 | Carter | 198—165 |
| 3,143,269 | 8/1964 | Van Eldik | 198—162 X |

EVON C. BLUNK, *Primary Examiner.*

A. C. HODGSON, M. L. AJEMAN, *Assistant Examiners.*